UNITED STATES PATENT OFFICE.

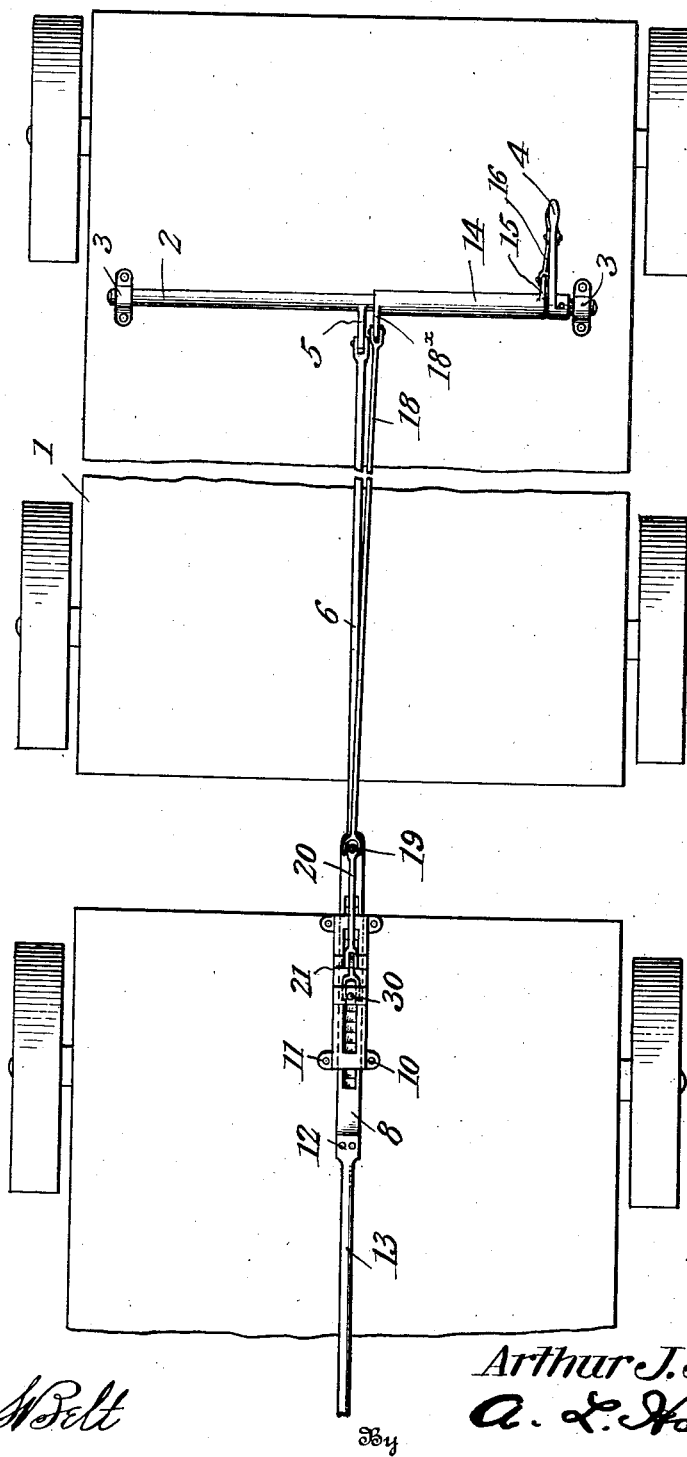

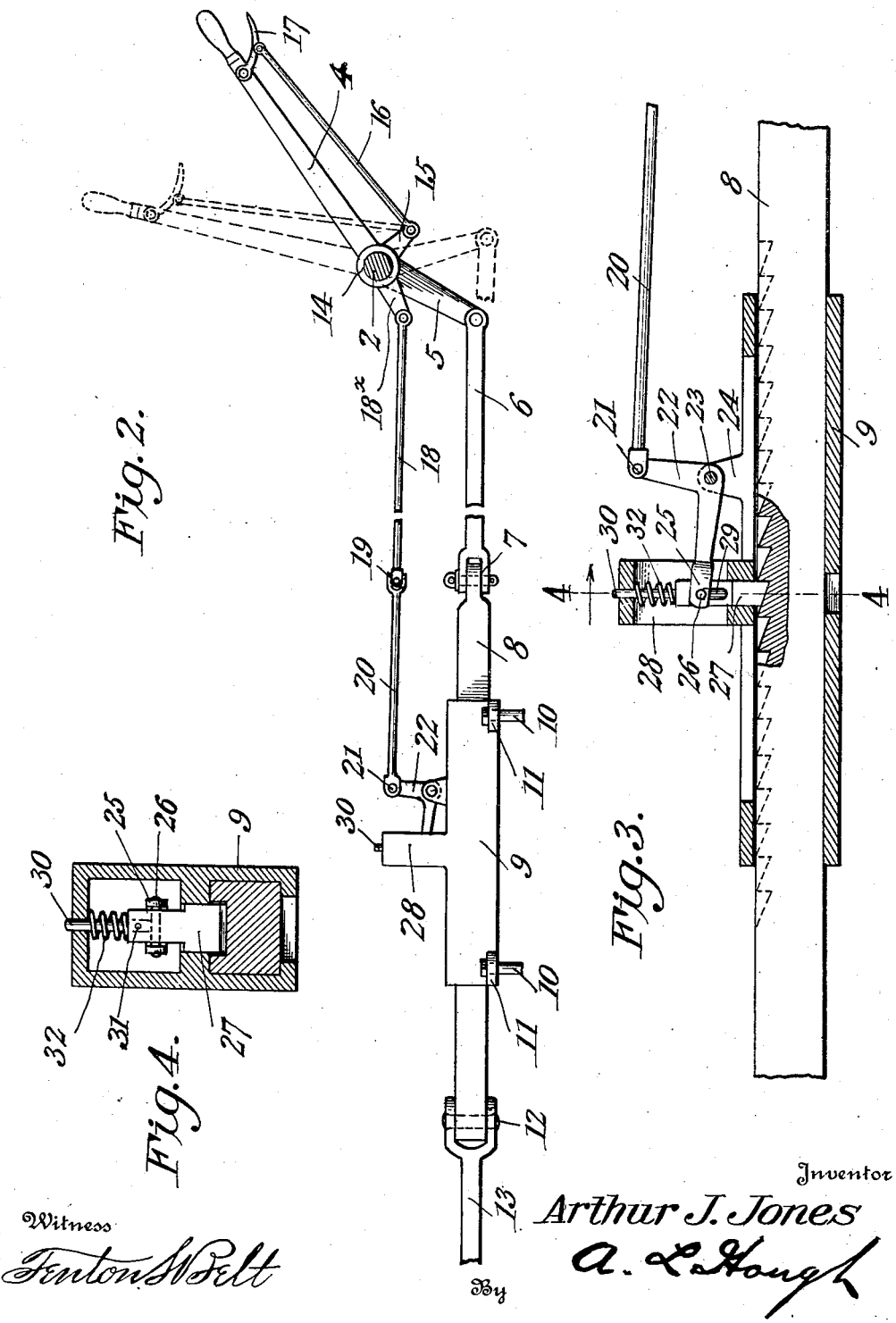

ARTHUR JOHN JONES, OF NEW YORK, N. Y., ASSIGNOR OF FOUR-TENTHS TO FREDERICK W. PRATT AND PHILIP R. PRATT, BOTH OF WASHINGTON, DISTRICT OF COLUMBIA.

BRAKE MECHANISM FOR TRACTOR-TRAILERS.

1,197,741.

Specification of Letters Patent. Patented Sept. 12, 1916.

Application filed December 23, 1915. Serial No. 68,353.

*To all whom it may concern:*

Be it known that I, ARTHUR JOHN JONES, a citizen of the United States, residing at New York, in the county of New York and State of New York, have invented certain new and useful Improvements in Brake Mechanism for Tractor-Trailers, of which the following is a specification, reference being had therein to the accompanying drawing.

This invention relates to new and useful improvements in brake mechanism for tractor trailers and consists of a simple and efficient means of this character so arranged that brakes upon the trailer may be easily and quickly applied and released.

My invention consists of a simple and efficient apparatus of this nature, having various details of construction, combinations and arrangements of parts which will be hereinafter fully described, shown in the accompanying drawings and then specifically defined in the appended claims.

My invention is illustrated in the accompanying drawings, in which:

Figure 1 is a bottom plan view of a portion of a tractor and trailer showing the application of my invention thereto. Fig. 2 is an enlarged detail in elevation of the brake mechanism. Fig. 3 is an enlarged detail in longitudinal section. Fig. 4 is a cross sectional view on line 4—4 of Fig. 3.

Reference now being had to the details of the drawings by numerals, 1 designates a tractor having a shaft 2 journaled in bearings 3 in the under side of the bottom, and 4 is a handle keyed to said shaft forming means for rocking the same to the position shown in Fig. 2 of the drawings. Said shaft has an arm 5 integral therewith to which is pivoted the forward end of the bar 6 having knuckle joint connections 7 with the ratchet bar 8, an enlarged detail view of which is shown in Fig. 3 of the drawings, and which has ratchet teeth upon its upper edge. Said rack bar is movable within the casing 9 which has an upright portion 28, and 27 is a pawl having a slot 29 therein which is normally held in the path of the ratchet teeth upon the ratchet bar by means of the coiled spring 32. An angle lever 22 is pivotally mounted upon a pin 23 mounted in the lugs 24 upon the boxing, and the forked ends 25 of said angle lever carry a pivotal pin 26 movable in the slot 29 and forming means for raising the pawl out of engagement with the teeth of the ratchet bar against the tension of the spring 32, mounted upon a pin 30, which latter is fastened to the pawl 27 by means of the pin 31.

A rod 20 is pivotally connected at 21 to one arm of the angle lever 22 and is connected through the medium of the knuckle joint 19 with the rod 18 which in turn is pivotally connected to an arm 18× integral with the sleeve 14, which is loosely journaled upon the shaft 2. Said sleeve is provided with an integral arm 15 which is pivotally connected to a rod 16, shown clearly in Fig. 2 of the drawings, and which in turn is pivoted to the handle 17 pivoted in turn to the lever 4. Said ratchet bar is pivotally connected at one end to a rod 13 which is adapted to be fastened to the brake mechanism, not shown.

The operation of my invention will be readily understood and is as follows:—
When it is desired to operate the mechanism, the operator by swinging the lever 4 from the position shown in solid lines in Fig. 2 to that in dotted lines will cause the ratchet bar 8 to be drawn forward, applying the brake, the pawl 27 riding idly over the ratchet teeth. When it is desired to release the brake, the operator by pulling upon the handle 17, controlling through the mechanism shown the pawl, the latter may be raised out of the path of the ratchet teeth, the ratchet bar to be moved in the opposite direction without interference with the pawl.

It will be noted that, by the provision of the elongated slot in which the pin 26 works, the brake lever may have a slight play independent of the means for releasing the pawl.

By the provision of the apparatus embodying the features of my invention, it will be noted that simple and efficient mechanism is afforded whereby the brake upon a trailer may be regulated by the manipulation of mechanism from the tractor.

What I claim to be new is:—

1. A brake mechanism for trailers of tractors comprising, in combination with the tractor and trailer, a rock shaft upon the tractor, a ratchet bar upon the trailer designed for attachment to the brake mechanism, connections between said ratchet bar and rock shaft, a pawl carried by the trailer and adapted to engage and hold the ratchet bar in different adjusted positions, and means for releasing the pawl from the ratchet bar.

2. In combination with a tractor and trailer, a casing upon the trailer, a ratchet bar movable within said casing, a spring-pressed pawl carried by the casing for engagement with the teeth of the ratchet bar, a rock shaft upon the tractor, pivotal rod connections between said rock shaft and ratchet bar, a lever fixed to said shaft, and means actuated by the lever for releasing said pawl.

3. In combination with a tractor and trailer, a casing upon the trailer, a ratchet bar movable within said casing, a spring-pressed pawl carried by the casing for engagement with the teeth of the ratchet bar, an angle lever pivoted to the casing and engaging said pawl, a rock shaft journaled upon the tractor, a lever fixed to the rock shaft, and means actuated by the lever upon the rock shaft for actuating the angle lever to release the pawl.

4. In combination with a tractor and trailer, a casing upon the trailer, a ratchet bar movable within said casing, a spring-pressed pawl carried by the casing for engagement with the teeth of the ratchet bar, an angle lever pivoted to the casing and having loose pivotal connection with the pawl, a rock shaft with pivotal knuckle connections with the ratchet bar, a sleeve journaled upon the rock shaft and having pivotal knuckle connections with said angle lever, a lever fixed to the rock shaft, a pivotal handle and rod connecting the same with said sleeve for releasing the pawl.

5. In combination with a tractor and trailer, a casing upon the latter, a raised portion thereon, a spring-pressed pawl mounted in the latter, a ratchet bar movable within the casing and engaged by said pawl, an angle lever pivoted upon the casing, said pawl having a slot therein, a pin carried by the angle lever and movable within said slot, a rock shaft upon the tractor and having an integral arm, pivotal knuckle joint connections between said arm and ratchet bar, a sleeve loosely mounted upon the rock shaft and having integral arms, one of which has pivotal knuckle connection with said angle lever, a lever fixed to the rock shaft, and pivotal rod connections between the same and the other of said arms upon the sleeve.

In testimony whereof I hereunto affix my signature in presence of two witnesses.

ARTHUR JOHN JONES.

Witnesses:
   Duncan L. Richmond,
   Walter M. Jones.